US010703482B1

(12) United States Patent
Puglisi et al.

(10) Patent No.: US 10,703,482 B1
(45) Date of Patent: Jul. 7, 2020

(54) DEPLOYABLE PORTABLE ELECTRONIC DEVICE HOLDER FOR AIRCRAFT SEAT

(71) Applicant: Rockwell Collins, Inc., Cedar Rapids, IA (US)

(72) Inventors: Stephen A. Puglisi, Greensboro, NC (US); Michael M. Princip, Winston-Salem, NC (US); Thomas L. Phillips, Winston Salem, NC (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/218,061

(22) Filed: Dec. 12, 2018

(51) Int. Cl.
*B64D 11/06* (2006.01)
*B64D 11/00* (2006.01)

(52) U.S. Cl.
CPC .... *B64D 11/00152* (2014.12); *B64D 11/0638* (2014.12)

(58) Field of Classification Search
CPC ............. B60R 2011/0082; B60R 11/02; B60R 11/0252; B60R 2011/0005; B60R 2011/0071; B60R 2011/0075; B60R 2011/0015; B60R 2011/0085; B60N 3/004; B60N 2002/905; B60N 3/001; B60N 3/002; B60N 3/102; B64D 11/00152; B64D 11/0638; B64D 11/0015
USPC .................................................. 224/432, 497
See application file for complete search history.

(56) References Cited

U.S. PATENT DOCUMENTS

| 8,091,850 | B2 * | 1/2012 | Carnevali | B25B 5/02 |
| | | | | 248/176.1 |
| 8,667,904 | B2 | 3/2014 | Pajic | |
| 8,826,830 | B2 | 9/2014 | Pajic | |
| 9,038,877 | B2 * | 5/2015 | Bijlholt | B60R 11/02 |
| | | | | 224/553 |
| 9,067,682 | B2 | 6/2015 | Pajic | |
| 9,167,905 | B2 | 10/2015 | Pajic | |
| 9,168,876 | B2 | 10/2015 | Pajic | |
| 9,242,733 | B2 | 1/2016 | Pajic | |
| 9,290,271 | B2 * | 3/2016 | Schurg | B64D 11/06 |
| 9,403,596 | B2 | 8/2016 | Pajic | |
| 9,409,647 | B2 | 8/2016 | Pajic | |
| 9,481,465 | B2 | 11/2016 | Pajic | |
| 9,511,862 | B2 * | 12/2016 | Thiele | B64D 11/00152 |
| 9,623,971 | B2 | 4/2017 | Pajic | |
| 9,698,851 | B2 * | 7/2017 | Andrus | H04B 1/3888 |
| 9,701,234 | B2 | 7/2017 | Pajic | |
| 9,902,339 | B2 * | 2/2018 | Gilling | B60R 11/02 |
| 10,396,584 | B2 * | 8/2019 | Madau | B60R 16/03 |
| 2012/0248833 | A1 | 10/2012 | Hontz et al. | |
| 2014/0042285 | A1 * | 2/2014 | Carnevali | B60R 11/02 |
| | | | | 248/316.4 |
| 2015/0175265 | A1 | 6/2015 | Thiele et al. | |
| 2016/0009394 | A1 | 1/2016 | Felske et al. | |
| 2016/0355263 | A1 * | 12/2016 | Pozzi | B64D 11/00152 |

(Continued)

*Primary Examiner* — Adam J Waggenspack
(74) *Attorney, Agent, or Firm* — Suiter Swants pc llo

(57) ABSTRACT

A portable electronic device holder, separate from an aircraft tray table, has a spring biased lower retention portion with lower retention plates for securing a lower edge of a portable electronic device. The lower retention plate acts in concert with either one or more ridges molded into or affixed to a recess in a seat back panel, or with a spring biased, extendable upper retention portion with an upper retention plate to hold the portable electronic device in place.

15 Claims, 7 Drawing Sheets

(56) References Cited

U.S. PATENT DOCUMENTS

2018/0072424 A1\* 3/2018 Irons ................ B64D 11/00152
2019/0202365 A1\* 7/2019 Medina Huerta ...... B60N 3/102

\* cited by examiner

DEPLOYABLE PORTABLE ELECTRONIC DEVICE HOLDER FOR AIRCRAFT SEAT

BACKGROUND

Portable electronic devices such as tablets and smartphones are ubiquitous on modern passenger aircraft. Passengers often prop-up their portable electronic devices via a tray table and the back surface of the seat in front of the passenger, possibly also utilizing a separate stand element built into a portable electronic device case.

Reclining seats can interfere with existing solutions allowing passengers to use portable electronic devices on an aircraft. For example, portable electronic device holders may be built into a tray table, but the separate ranges of motion between the tray table and the corresponding reclining seat means that a position and orientation of a portable electronic device that is suitable when the seat is upright may be unsuitable when the seat is reclined. Furthermore, tray tables are no longer a standard configuration.

Existing solutions disposed directly beneath an in-seat video monitor require a bifold tray table because there isn't enough space for a single-piece tray table. Currently, there is no portable electronic device holder option separate from a single-piece tray table.

SUMMARY

In one aspect, embodiments of the inventive concepts disclosed herein are directed to a portable electronic device holder, separate from an aircraft tray table, having a spring biased lower retention portion with lower retention plates for securing a lower edge of a portable electronic device. The lower retention plate may act in concert with ridges molded into or affixed to a recess in a seat back panel to hold the portable electronic device in place. Alternatively, the lower retention plate may act in concert with a spring biased, extendable upper retention portion with an upper retention plate to hold the portable electronic device in place.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1A:
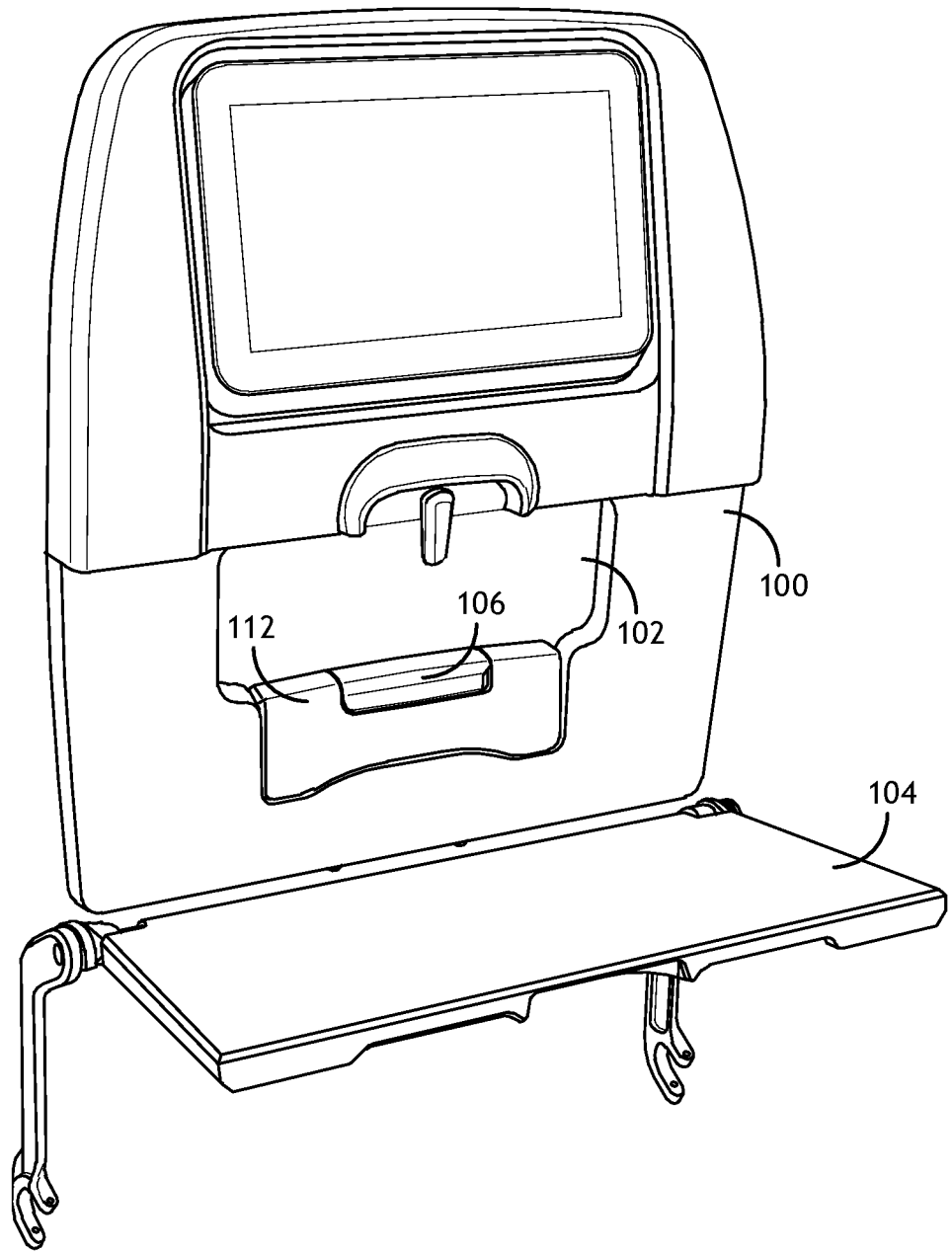
FIG. 1A shows an environmental perspective view of an exemplary embodiment of a mobile device holder according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a tray table assembly including a portable electronic device holder, separate from the tray table, having upper and lower holding elements. The upper holding element is biased toward a closed position to apply a slight pressure to the portable electronic device and hold it stationary relative to the seat back in which the tray table assembly is installed.

Figure 1B:
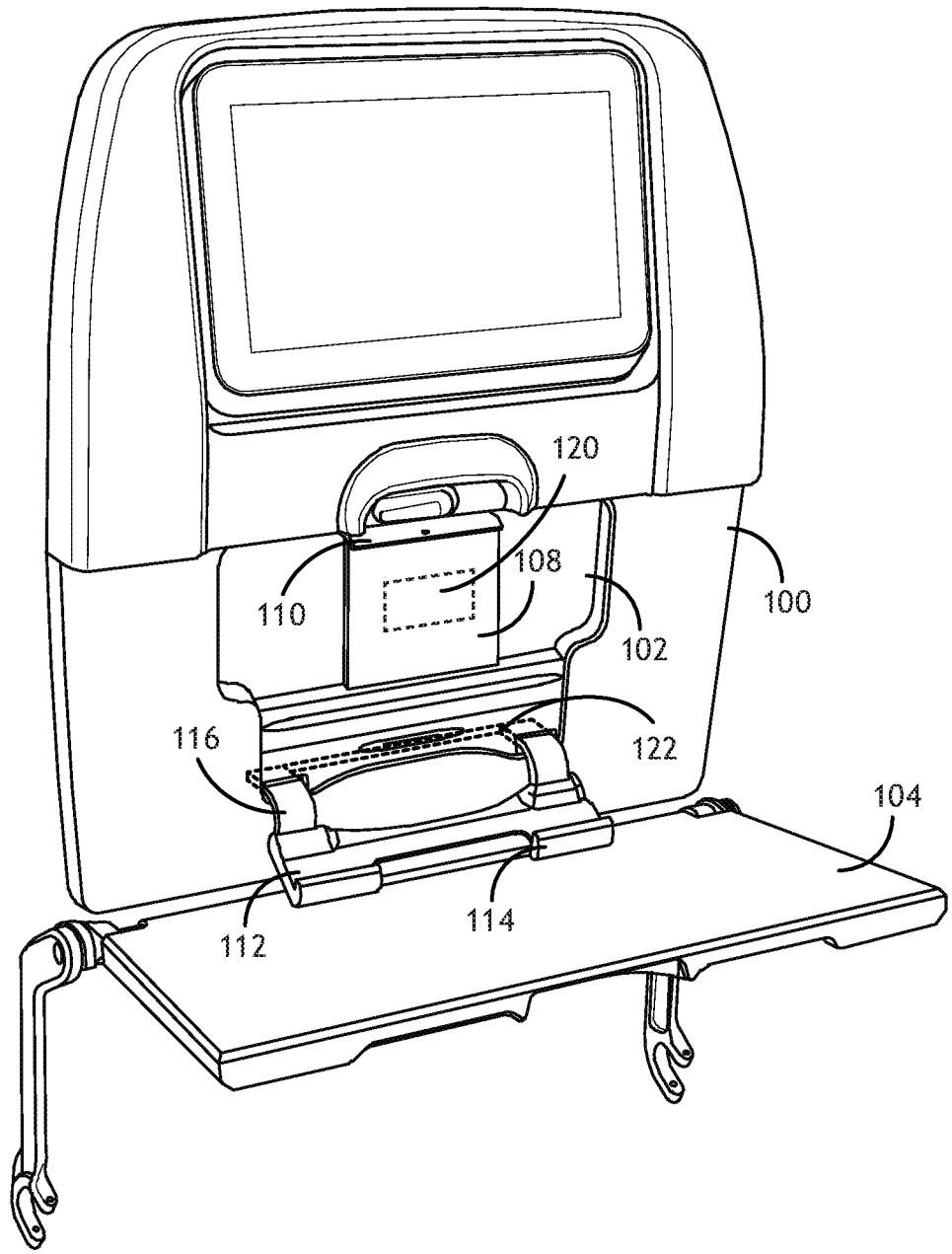
FIG. 1B shows an environmental perspective view of an exemplary embodiment of a mobile device holder such as in FIG. 1A according to the inventive concepts disclosed herein.
Figure 1C:
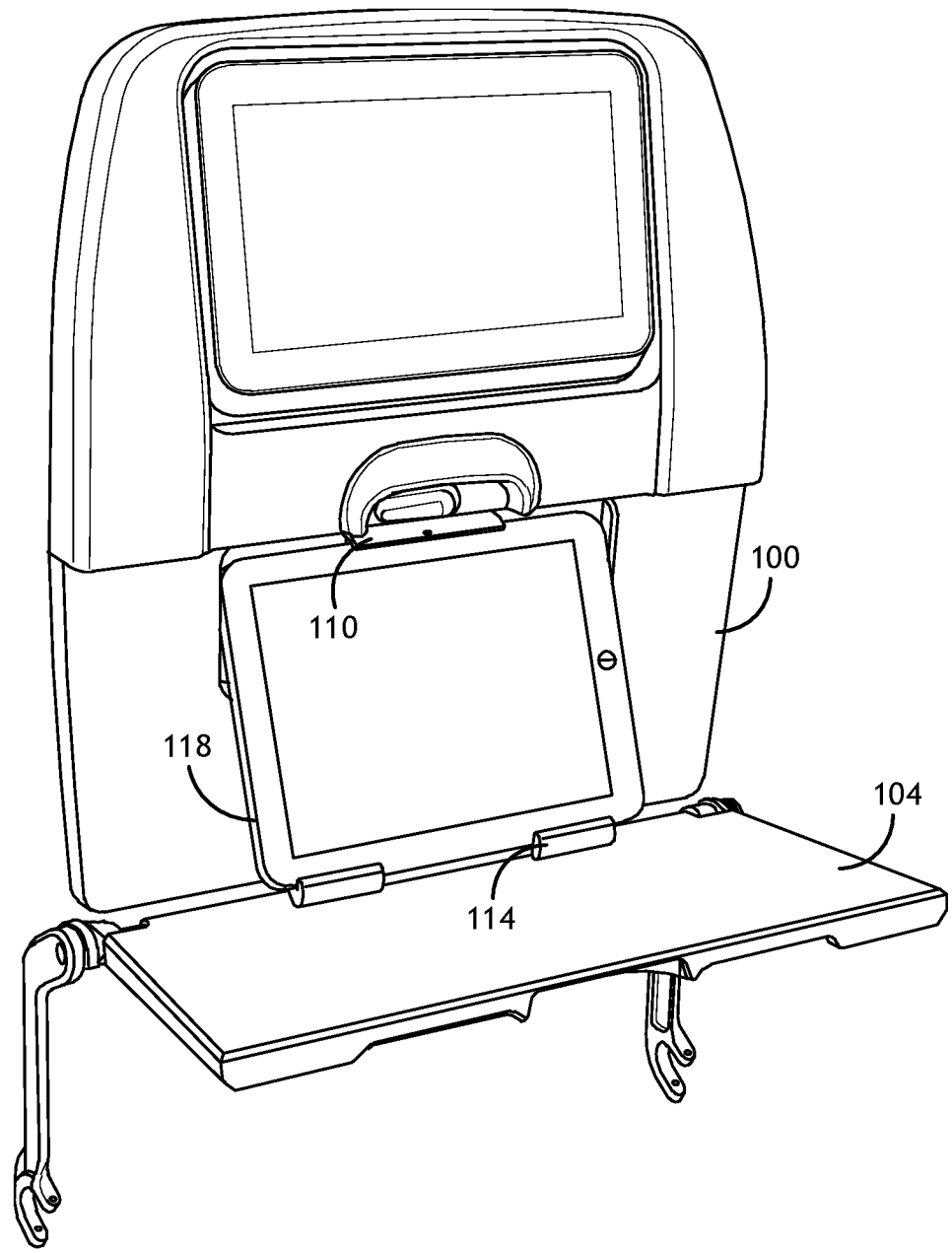
FIG. 1C shows an environmental perspective view of an exemplary embodiment of a mobile device holder such as in FIG. 1A according to the inventive concepts disclosed herein.
Figure 2A:
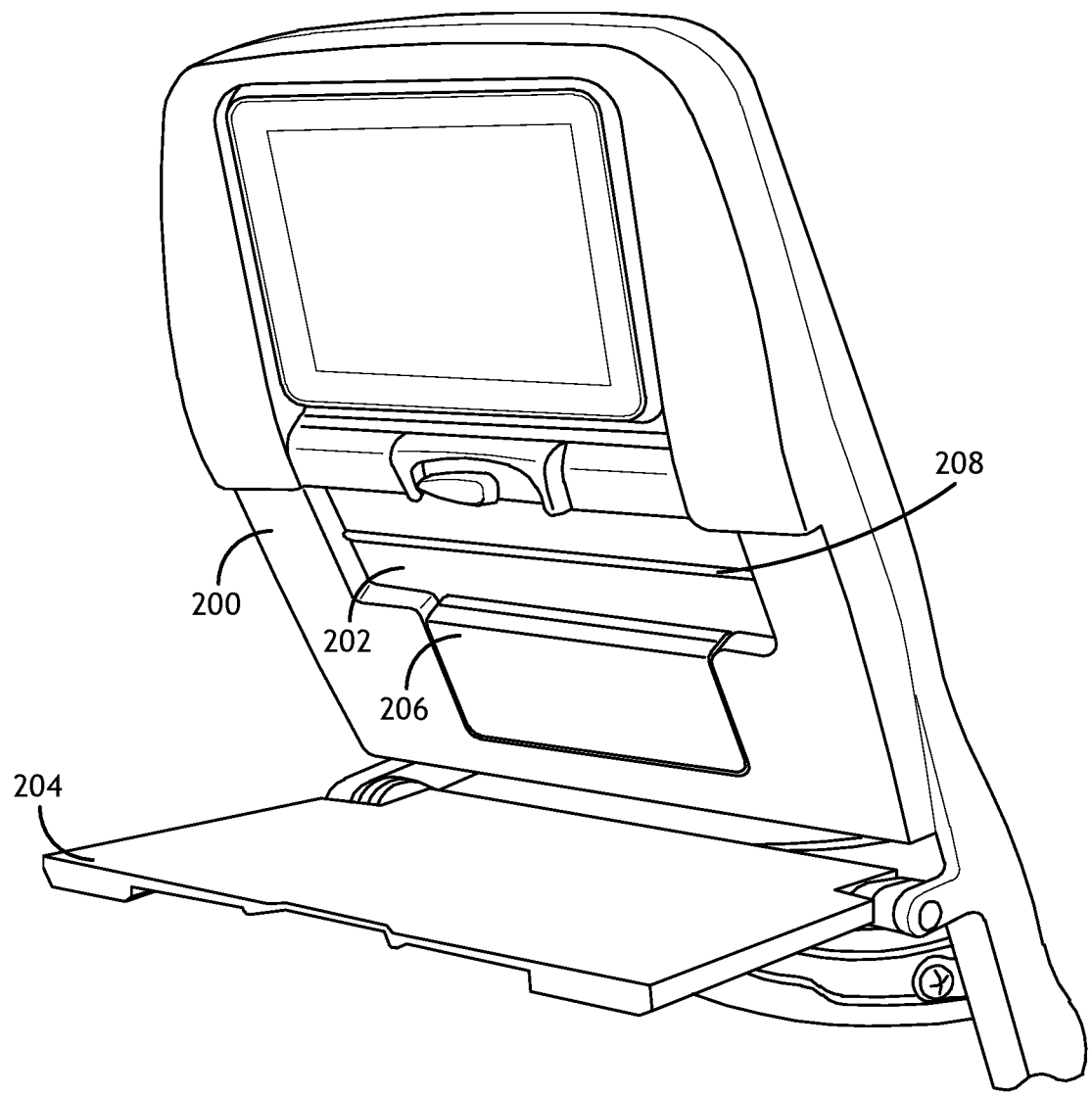
FIG. 2A shows an environmental perspective view of an exemplary embodiment of a mobile device holder according to the inventive concepts disclosed herein.
Figure 2B:
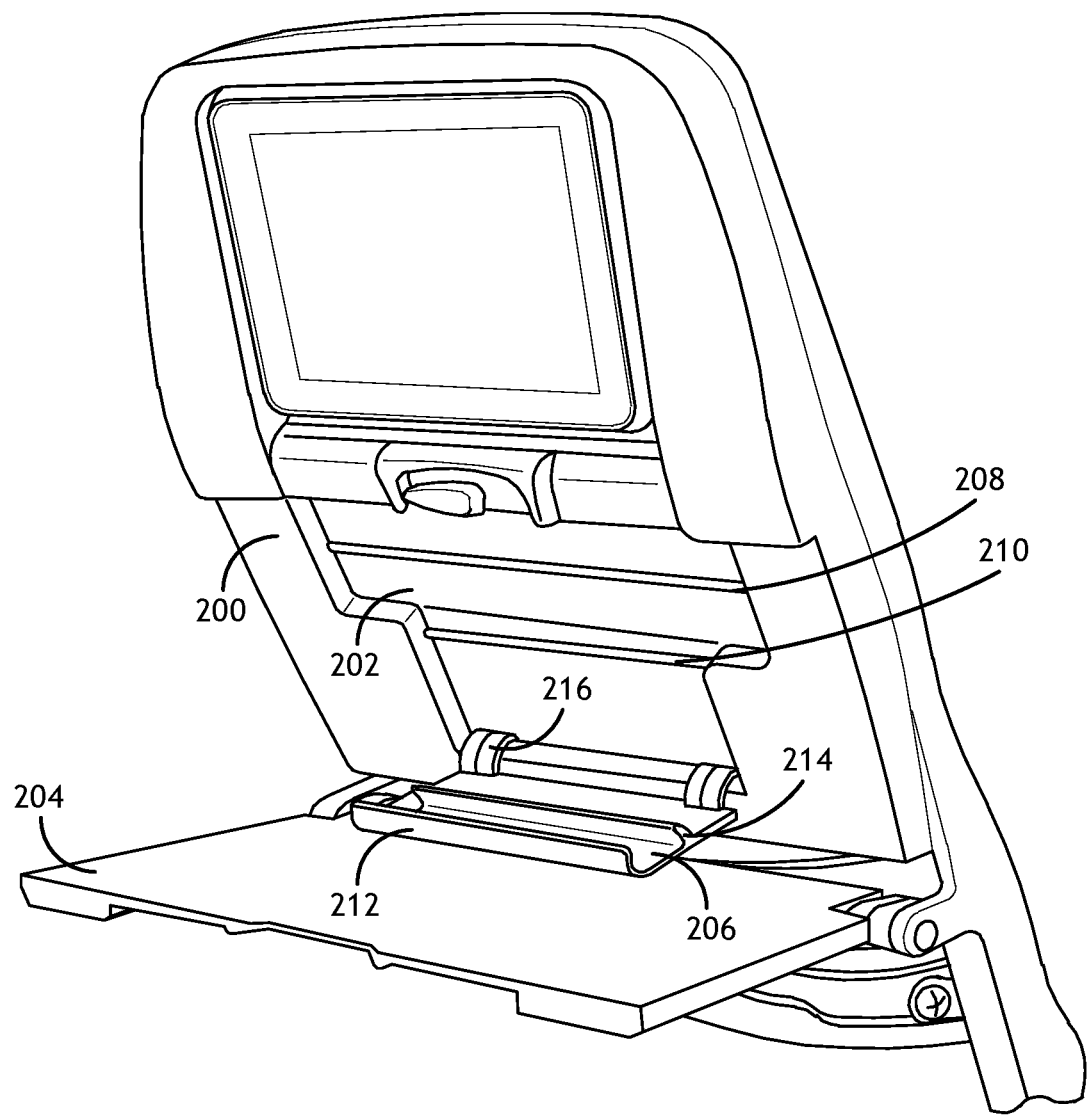
FIG. 2B shows an environmental perspective view of an exemplary embodiment of a mobile device holder such as in FIG. 2A according to the inventive concepts disclosed herein.
Figure 2C:
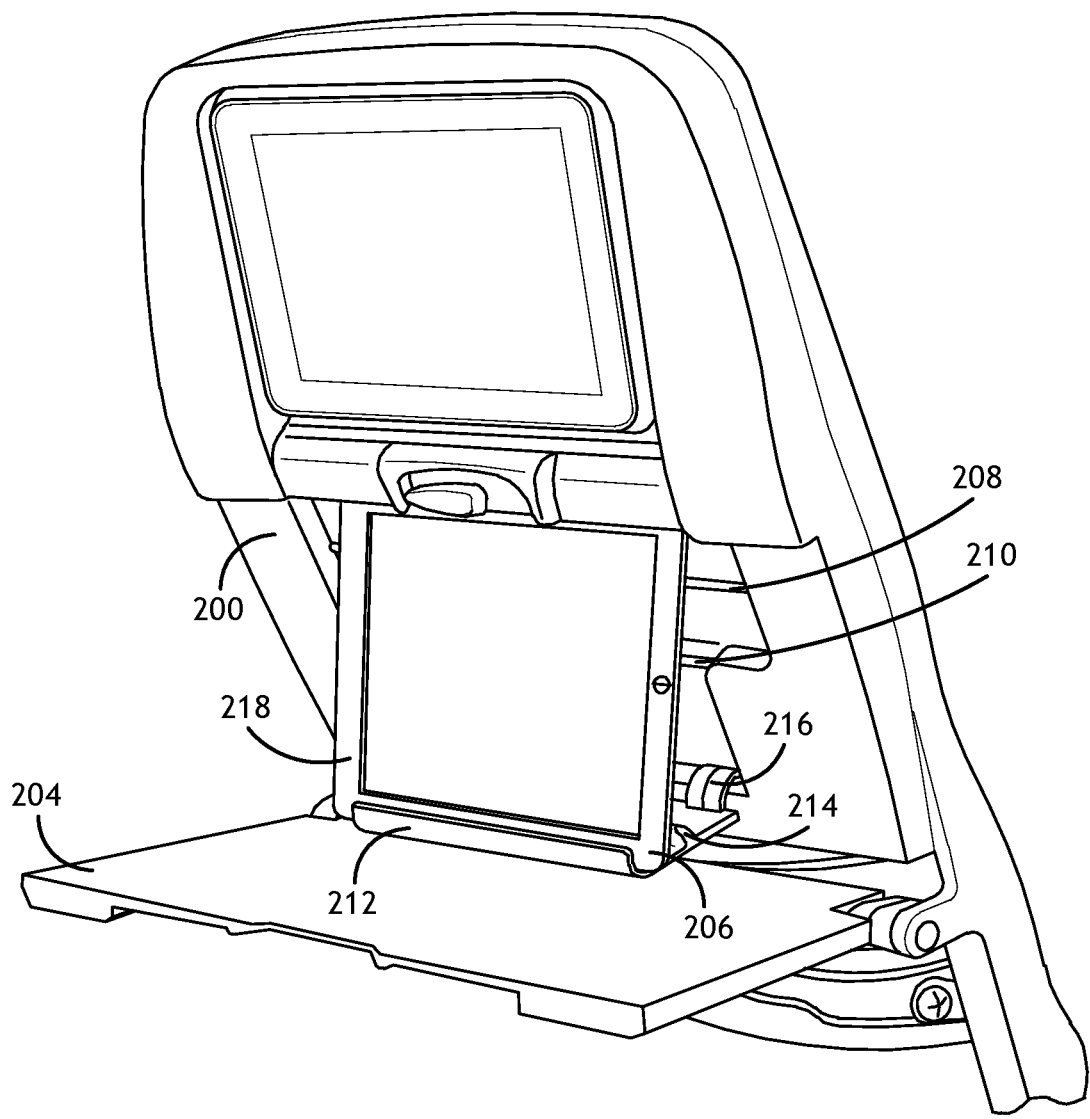
FIG. 2C shows an environmental perspective view of an exemplary embodiment of a mobile device holder such as in FIG. 2A according to the inventive concepts disclosed herein.
Figure 2D:
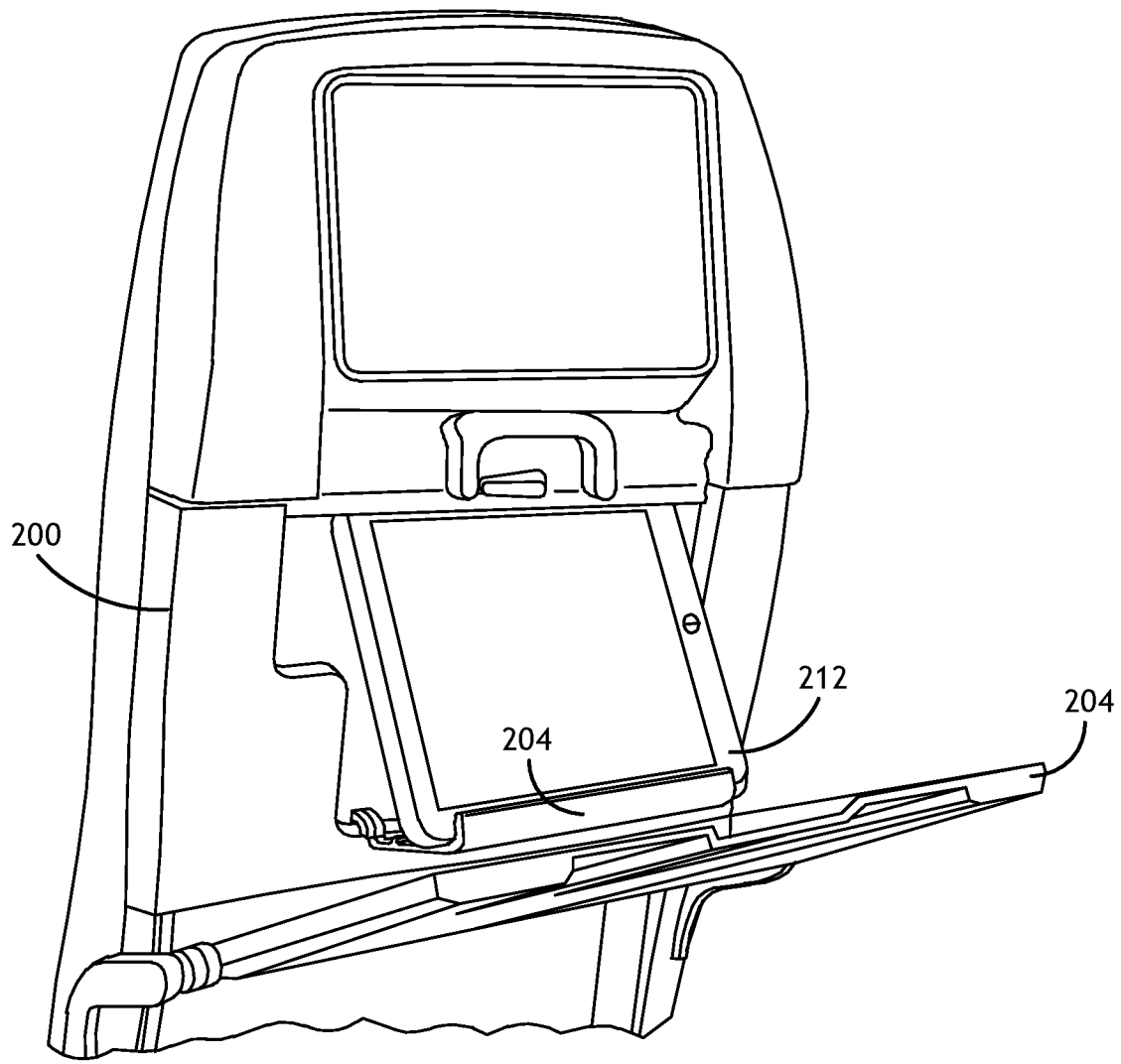
FIG. 2D shows an environmental perspective view of an exemplary embodiment of a mobile device holder such as in FIG. 2A according to the inventive concepts disclosed herein.

Referring to FIGS. 1A-1C, environmental perspective views of an exemplary embodiment of a mobile device holder according to the inventive concepts disclosed herein are shown. A video bezel 100 defines a recess 102, accessible when the corresponding tray table 104 is down. It will be appreciated that embodiments of the present disclosure are suitable for assemblages affixed to the rear portion of an aircraft seat, even where such assemblages do not include a video monitor.

In at least one embodiment, an upper retention portion 106 comprising one or more extension arms 108, and an upper retention plate 110 disposed on the extension arms 108, is configured to move up and down within a recess defined by the video bezel 100. Likewise, a lower retention portion 112 comprises one or more extension arms 116 and a lower retention plate 114.

In at least one embodiment, the portable electronic device holder includes a wireless, inductive charging element 120. Such wireless, inductive charging element 120 may be disposed within the one or more extension arms 108 to be proximal to the portable electronic device 118. Furthermore, the wireless, inductive charging element 120 may be activated when the extension arms 108 are extended beyond a certain threshold corresponding to a distance necessary to secure an average smart phone.

In at least one embodiment, the upper retention plate 110 is angled so as to apply a small force to an edge of a portable electronic device 118 and bias the device toward the recess 102. The upper retention plate 110 and lower retention plate 112 operate in concert to retain the portable electronic device 118 in a static position relative to the video bezel 100. Furthermore, the lower retention plate 114 and upper retention plate 110 roughly define a plane corresponding to a viewing angle of the portable electronic device 118 for an average passenger.

In at least one embodiment, the extension arms 116 of the lower retention portion 112 operate within a track or guide defined by the video bezel 100 to rotate the lower retention portion 112 from a closed or stowed orientation (as shown in FIG. 1A) to a deployed orientation (as shown in FIGS. 1B and 1C).

In at least one embodiment, the upper retention portion 106 is biased toward a closed or stowed orientation via one or more springs, hydraulic actuators, or other such biasing elements (obscured by the video bezel 100). Such biasing elements maintain positive contact between the upper retention plate 110 and portable electronic device 118, and by extensions the portable electronic device 118 and the lower retention plate 114.

A passenger may insert the top edge of their portable electronic device 118 under the upper retention plate 110, slide the upper retention plate 110 upward until the lower edge of the portable electronic device 118 can rest on the lower retention plate 114. The biased element makes the upper retention plate 110 and lower retention plate 114 act as a clamp, securing the portable electronic device in place. The clamping feature provides a secure fit to ensure the portable electronic device 118 remains in place during flight. The adjustable nature allows the passenger to use various types and sizes of portable electronic devices 118.

In at least one embodiment, the extension arms 116 of the lower retention portion 112 may include a cam or other linkage 122 (obscured by the video bezel 100) configured to engage a surface of the extension arm 108 of the upper retention portion 106 and push the upper retention portion 106 up in opposition to the biasing elements to allow a passenger to grip the upper retention plate 110 and extend it further upward as necessary to fit the passenger's portable electronic device 118. Furthermore, the lower retention portion 112 may be spring biased, via the extension arms 116, into a deployed configuration.

In at least one embodiment, the upper retention portion 106 is biased toward a neutral orientation via one or more springs, hydraulic actuators, or other such biasing elements (obscured by the video bezel 100); such neutral orientation is neither fully stowed nor fully extended. In such embodiments, the extension arms 116 of the lower retention portion 112 may include a latch configured to engage a strike on the extension arm 108 of the upper retention portion 106 to maintain the upper retention portion 106 in a stowed orientation until released by rotating the lower retention portion 112 into a deployed orientation. Alternatively, the latch and strike dispositions may be reversed.

Referring to FIGS. 2A-2D, environmental perspective views of an exemplary embodiment of a mobile device holder according to the inventive concepts disclosed herein are shown. A passenger seat rear plate component 200 defines a recess 202, accessible when the corresponding tray table 204 is down.

In at least one embodiment, one or more upper retention elements 208, 210 are disposed on or defined by the recess 202. Likewise, a Lower retention portion 206 comprises one or more extension arms 216 and one or more lower retention plates 212, 214.

In at least one embodiment, the upper retention elements 208, 210 define an upper boundary for a corresponding edge of a portable electronic device 218. Alternatively, the upper retention elements 208, 210 may comprise a vibration dampening material wherein the portable electronic device 218 may rest on the upper retention elements 208, 210.

In at least one embodiment, each of the one or more lower retention plates 212, 214 defines a specific viewing angle when the portable electronic device 218 is in place. Alternatively, or in addition, each of the lower retention plates 212, 214 may work in concert to retain the portable electronic device 218 in position and potentially define a specific viewing angle.

In at least one embodiment, one or more of the lower retention plates 212, 214 and upper retention elements 208, 210 may be oriented so as to interlock when the lower retention portion 206 is in a stowed orientation.

In at least one embodiment, the upper retention element 208 is biased toward a closed or stowed orientation via one or more springs, hydraulic actuators, or other such biasing elements (obscured by the passenger seat rear plate component 200). Such biasing elements maintain positive contact between the upper retention elements 208, 210 and portable electronic device 218, and by extensions the portable electronic device 218 and the corresponding lower retention plate 212, 214.

In at least one embodiment, a distal portion of the one or more extension arms 216 may define a stop to limit the range of motion when the lower retention portion 206 is in a deployed orientation. Furthermore, the lower retention portion 206 may be spring biased, via the one or more extension arms 216, into a deployed orientation.

The passenger inserts the bottom edge of their portable electronic device 218 behind a lower retention plate 212, 214. The biasing element acts as a clamp to secure the portable electronic device in place against the upper retention elements 208, 210.

Alternatively, the upper retention elements 208, 210 may comprise elastic straps installed on horizontal rails. A passenger may adjust such elastic straps up and down to accommodate various types and sizes of portable electronic devices 218.

In at least one embodiment, an existing bezel or rear plate component (100, 200) may be modified to incorporate a removable portable electronic device holder according to embodiments of the present disclosure for easier maintenance. For example, a system such as in FIGS. 1A-1C may comprise a self-contained unit releasably fixed in an opening cut into a surface of the bezel 100. Likewise, such as in FIGS. 2A-2D, the lower retention portion 206 may comprise a self-contained unit releasably fixed in an opening cut into a surface of the rear plate component 200.

Embodiments of the present disclosure facilitate a standard sized aircraft seat-equipped monitor, a single-piece tray table, and a portable electronic device holder on one seat back, where the portable electronic device holder is completely separate from the tray table.

Furthermore, while the examples described herein have referred to a device installed as a seat back appliance, embodiments may also be installed on a bulkhead in front of an aircraft seat.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A portable electronic device holder, disposed in an aircraft seat back housing, comprising:
  a lower retention portion comprising at least two retention plates configured to abut an edge of a portable electronic device, a first lower retention plate defining a first viewing angle and a second lower retention plate defining a second viewing angle;
  one or more lower extension arms disposed on a surface of the lower retention portion, the one or more extension arms configured to allow the lower retention portion to rotate away from an aircraft seat back; and
  one or more upper retention elements,
  wherein the at least two lower retention plates and one or more upper retention elements are configured to hold the portable electronic device in a static position relative to the aircraft seat back, and interlock when in a stowed orientation.

2. The portable electronic device holder of claim 1, wherein the one or more upper retention elements comprise an upper retention plate disposed on an upper extension arm, the upper extension arm configured to move linearly along a path parallel to the aircraft seat back.

3. The portable electronic device holder of claim 2, wherein the upper retention element is biased toward a stowed orientation by a spring.

4. The portable electronic device holder of claim 3, further comprising a linkage disposed on the one or more lower extension arms, the linkage configured to apply an upward force to the upper extension arm to partially extend the upper retention element upward.

5. The portable electronic device holder of claim 2, further comprising an inductive charging element disposed in the upper extension arm.

6. An aircraft passenger seat comprising:
  a portable electronic device holder comprising:
    a lower retention portion comprising at least two lower retention plates configured to abut an edge of a portable electronic device, a first lower retention plate defining a first viewing angle and a second lower retention plate defining a second viewing angle;
    one or more lower extension arms disposed on a surface of the lower retention portion, the one or more extension arms configured to allow the lower retention portion to rotate away from the aircraft passenger seat back; and
    one or more upper retention elements,
    wherein the at least two lower retention plates and one or more upper retention elements are configured to hold the portable electronic device in a static position relative to the aircraft passenger seat back, and interlock when in a stowed orientation.

7. The aircraft passenger seat of claim 6, wherein the upper retention elements are disposed on the aircraft seat back.

8. The aircraft passenger seat of claim 6, wherein the one or more upper retention elements comprise an upper retention plate disposed on an upper extension arm, the upper extension arm configured to move linearly along a path parallel to the aircraft passenger seat back.

9. The aircraft passenger seat of claim 8, wherein the upper retention element is biased toward a stowed orientation by a spring.

10. The aircraft passenger seat of claim 9, further comprising a linkage disposed on the one or more lower extension arms, the linkage configured to apply an upward force to the upper extension arm to partially extend the upper retention element upward.

11. An aircraft comprising:
  an aircraft passenger seat having a portable electronic device holder comprising:
    a lower retention portion comprising at least two lower retention plates configured to abut an edge of a portable electronic device, a first lower retention plate defining a first viewing angle and a second lower retention plate defining a second viewing angle;
    one or more lower extension arms disposed on a surface of the lower retention portion, the one or more extension arms configured to allow the lower retention portion to rotate away from an aircraft seat back; and one or more upper retention elements, wherein the at least two lower retention plates and one or more upper retention elements are configured to hold the portable electronic device in a static position relative to the aircraft seat back, and interlock when in a stowed orientation.

12. The aircraft of claim 11, wherein the upper retention elements are disposed on the aircraft seat back.

13. The aircraft of claim 11, wherein the one or more upper retention elements comprise an upper retention plate disposed on an upper extension arm, the upper extension arm configured to move linearly along a path parallel to the aircraft seat back.

14. The aircraft of claim 13, wherein the upper retention element is biased toward a stowed orientation by a spring.

15. The aircraft of claim 14, further comprising a linkage disposed on the one or more lower extension arms, the linkage configured to apply an upward force to the upper extension arm to partially extend the upper retention element upward.

* * * * *